July 8, 1958
L. J. CHRISTMANN
2,842,584
PRODUCTION OF SUCCINONITRILE
Filed Dec. 11, 1956
FIG. I.
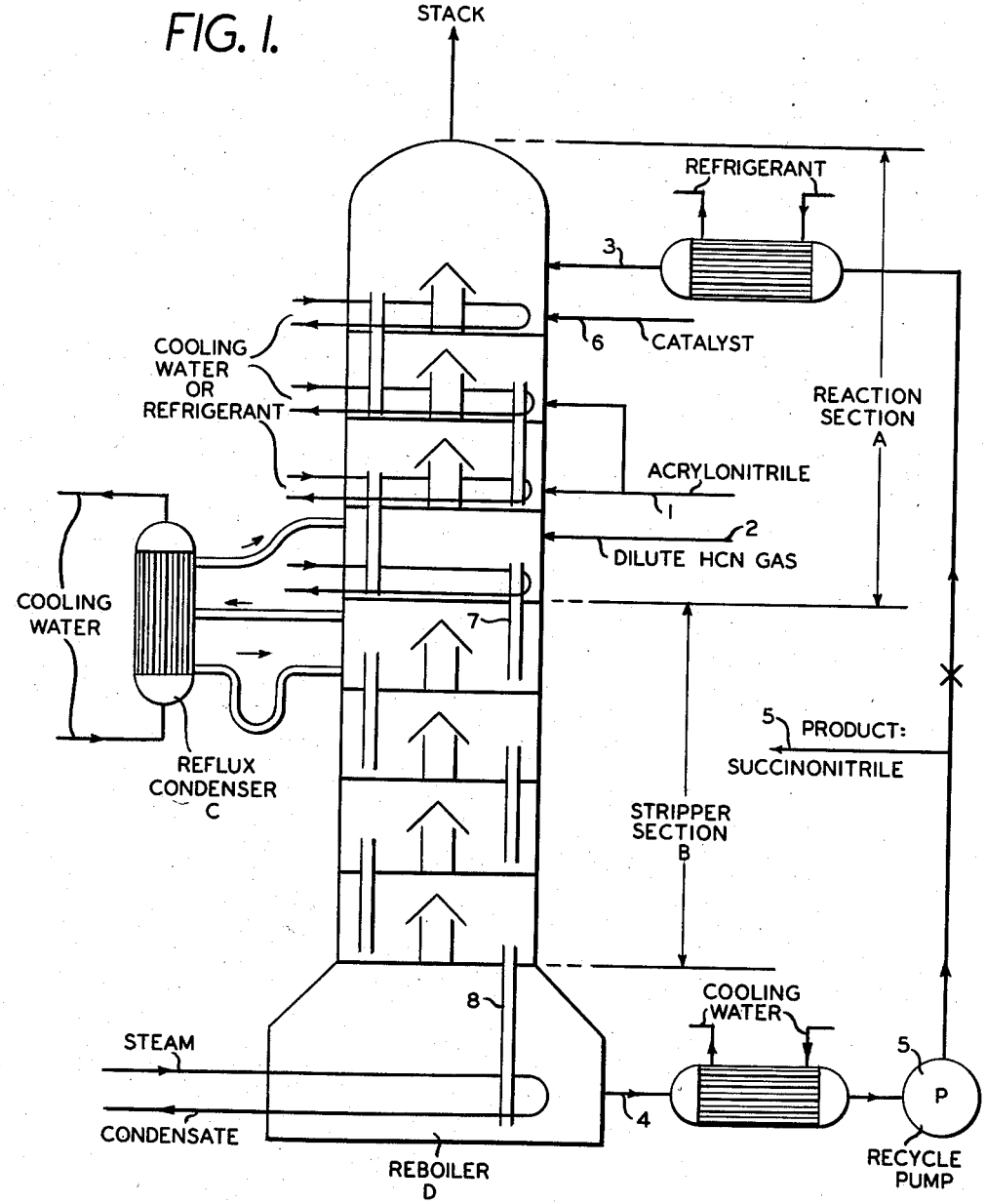
INVENTOR
LUDWIG J. CHRISTMANN.

2,842,584

PRODUCTION OF SUCCINONITRILE

Ludwig J. Christmann, Bronxville, N. Y., assignor to Carbogen Corporation, New York, N. Y.

Application December 11, 1956, Serial No. 627,682

7 Claims. (Cl. 260—465.8)

This invention concerns a continuous process for the production of succinonitrile from acrylonitrile and dilute hydrogen cyanide gas.

The reaction:

$$CH_2:CHCN + HCN \rightarrow NCCH_2CH_2CN$$

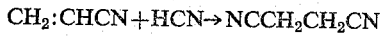

is known and has been carried out in a batch system. The reaction is highly exothermic and if proper measures are not taken to remove the heat evolved, there is danger of the reaction taking place with explosive violence.

Usually anhydrous or nearly anhydrous HCN is used. This is necessary because acrylonitrile reacts with water to form β-hydroxy propionitrile and this product in turn reacts with additional acrylonitrile to form dicyanopropionyl ether. Other side reactions, including polymerization of acrylonitrile occur if proper precautions are not taken. The use of anhydrous HCN introduces several difficulties. In the first place, HCN is highly toxic. In the second, it is difficult to avoid polymerization of the HCN itself. In the third place, concentrated HCN reacts very quickly with acrylonitrile making it difficult to control the reaction.

In the present invention conditions are established which give complete control of the heat removal and permit the use of gas mixtures dilute in hydrogen cyanide. My process makes use of HCN in gas mixtures produced by an Andrussow burner without requiring the expensive recovery purification and liquefaction of the HCN from such mixtures. The gas mixtures from the Andrussow burner, after removal of ammonia and water, contain about 9% HCN.

Using such dilute HCN-containing gas is highly desirable since elimination of concentration reduces the cost of this raw material. I have found that I can obtain reaction by bringing such dilute HCN gas into contact with acrylonitrile under proper conditions. I do not need liquid HCN. In addition, by using HCN gas, diluted with inert gases I can easily control the speed of reaction by adjusting to rate of flow. I can also operate continuously on the gases from the Andrussow burner and so avoid the necessity for storage and handling of quantities of HCN.

My process consists in flowing succinonitrile downward through a reaction tower, introducing acrylonitrile and flowing the liquid counter-current to a rising stream of dilute HCN gas. The inert gas carries off some acrylonitrile vapors and some HCN. In order to recover these, I scrub the exhaust gases with cooled succinonitrile. By heating this solution I drive off the recovered materials and re-introduce them into the reactor. This and other features of my invention are given in the description below.

This invention is illustrated diagrammatically by Fig. 1. The apparatus shown therein, simplified for clarity, comprises a column consisting of a heated reboiler D at the bottom, a stripper section B above the reboiler and a cooled reaction section A at the top. In addition, a reflux condenser C, and coolers in the succinonitrile recycle circuit are used.

In operation of the process acrylonitrile and dilute HCN gas, at room temperature and in mol ratio essentially equal to one, are added continuously to the bottom of the reaction section A at the points respectively 1 and 2. The gas is relatively free from ammonia and from water. The acrylonitrile addition may be made at several points in the reaction section. The purpose of this multiple addition is to control the amount of heat developed at any point to that which may be conveniently removed by cooling and so to maintain the reaction temperature. The inert bases, entering the reaction section together with unreacted HCN and acrylonitrile vapor pass up through this section where they are scrubbed with downward flowing succinonitrile which is introduced into the top of the reaction section at 3. The temperature of the succinonitrile introduced into the top of the reaction section as well as the amount introduced is controlled to keep the losses of HCN and acrylonitrile in the stack to an economically acceptable minimum and depend on the capacity at which the system is called upon to operate.

The succinonitrile leaving the bottom of the reaction section together with any dissolved HCN or acrylonitrile flows into the top of the stripping section B. It flows downward against rising succinonitrile vapor from the reboiler D. The dissolved HCN and acrylonitrile are driven off. The vapor leaving the top of the stripper may be passed through a condenser C before reintroduction into the reaction section A. Condensate from the condenser is run back to the top of the stripper B.

Succinonitrile leaving the reboiler D at 4 is cooled and recycled after withdrawing as product enough succinonitrile to maintain the level in the reboiler.

The catalyst added to the top of the reaction section A at 3 may be either an alkyl metal cyanide or hydroxide.

The auxiliary equipment such as heat exchangers, pumps, tanks, controls, instruments, etc., are not shown in the figure. Equipment such as this is of course required for a commercial plant.

While I have mentioned dilute HCN from the Andrussow process, I may use diluted HCN from any source. Gases containing HCN in concentration of 4 to 70% by volume are suitable.

What I claim is:

1. A method for the continuous production of succinonitrile which comprises flowing a stream of liquid succinonitrile downwardly in a reaction zone, introducing into the bottom of said zone a dilute HCN gas containing not over 50% of HCN and substantially free from ammonia and water, introducing acrylonitrile into said zone and cooling said zone, removing from the lower part of said zone the liquid reaction mass, then heating said mass to vaporize unreacted HCN and acrylonitrile and thereafter cooling the liquid succinonitrile product.

2. A method for the continuous production of succinonitrile which comprises flowing a stream of liquid succinonitrile downwardly in a reaction zone, introducing into the bottom of said zone a dilue HCN gas containing not over 50% of HCN and substantially free from ammonia and water, introducing acrylonitrile into said zone and cooling said zone, removing from the lower part of said zone the liquid reaction mass, then heating said mass to vaporize unreacted HCN and acrylonitrile and thereafter cooling the liquid succinonitrile products, and scrubbing the exhaust gases with liquid succinonitrile to recover HCN and acrylonitrile vapors.

3. A method for the continuous production of succinonitrile which comprises flowing a stream of liquid succinonitrile downwardly in a reaction zone, introducing into the bottom of said zone a dilute HCN gas containing not over 50% of HCN and substantially free from ammonia and water, introducing acrylonitrile in said zone and cooling said zone, removing from the lower part of said zone the liquid reaction mass, then heating said mass to vaporize unreacted HCN and acrylonitrile and reintroducing said vapors into said flowing stream, and thereafter cooling the liquid succinonitrile product.

4. A method for the continuous production of succinonitrile which comprises flowing a stream of liquid succinonitrile downwardly in a reaction zone, introducing into the bottom of said zone a dilute HCN gas containing not over 50% of HCN and substantially free from ammonia and water, introducing acrylonitirile into said zone and cooling said zone, removing from the lower part of said zone the liquid reaction mass, then heating said mass to vaporize unreacted HCN and acrylonitrile, passing said vapors through a reflux and reintroducing said vapors into said flowing stream, and thereafter cooling the liquid succinonitrile product.

5. A method for the continuous production of succinonitrile from acrylonitrile and dilute HCN gas having not over about 50% of HCN, characterized by the continuous introduction of acrylonitrile and dilute HCN gas substantially free from ammonia and water into a stream of liquid succinonitrile, wherein the stream of succinonitrile enters the top of a cooled reaction section, flows downward through it and then downard through a stripper and a reboiler to remove dissolved HCN and acrylonitrile.

6. A method for the continuous production of succinonitrile from acrylonitrile and dilute HCN gas having not over about 50% of HCN, characterized by the continuous introduction of acrylonitrile and dilute HCN gas substantially free from ammonia and water into a stream of liquid succinonitrile, wherein the stream of succinonitrile enters the top of a cooled reaction section, flows downward through it and then downward through a stripper and a reboiler to remove dissolved HCN and acrylonitrile, and wherein the acrylonitrile and the dilute HCN gas are added to the bottom of the reaction section and the product succinonitrile is withdrawn from the succinonitrile stream between the reboiler and the top of the reaction section.

7. A method for the continuous production of succinonitrile from acrylonitrile and dilute HCN gas having not over about 50% of HCN, characterized by the continuous introduction of acrolynitrile and dilute HCN gas substantially free from ammonia and water into a stream of liquid succinonitrile, wherein the stream of succinonitrile enters the top of a cooled reaction section, flows downward through it and then downward through a stripper and a reboiler to remove dissolved HCN and acrylonitrile, and wherein the acrylonitrile is added at more than one point in the reaction section and the dilute HCN gas is added at the bottom of the reaction section and succinonitrile is removed from the succinonitrile stream somewhere between the exit of the reboiler and the top of the reaction section.

References Cited in the file of this patent

UNITED STATES PATENTS

| | | |
|---|---|---|
| 2,427,601 | Harris | Sept. 16, 1947 |
| 2,434,606 | Carpenter | Jan. 13, 1948 |
| 2,481,580 | Dreyfus | Sept. 13, 1949 |
| 2,692,276 | Georg et al. | Oct. 19, 1954 |

FOREIGN PATENTS

| | | |
|---|---|---|
| 707,852 | Germany | July 5, 1941 |